W. L. FIELD.
HORSESHOE CALK MAKING MACHINE.
APPLICATION FILED FEB. 9, 1915.
1,169,785.
Patented Feb. 1, 1916.
5 SHEETS—SHEET 3.
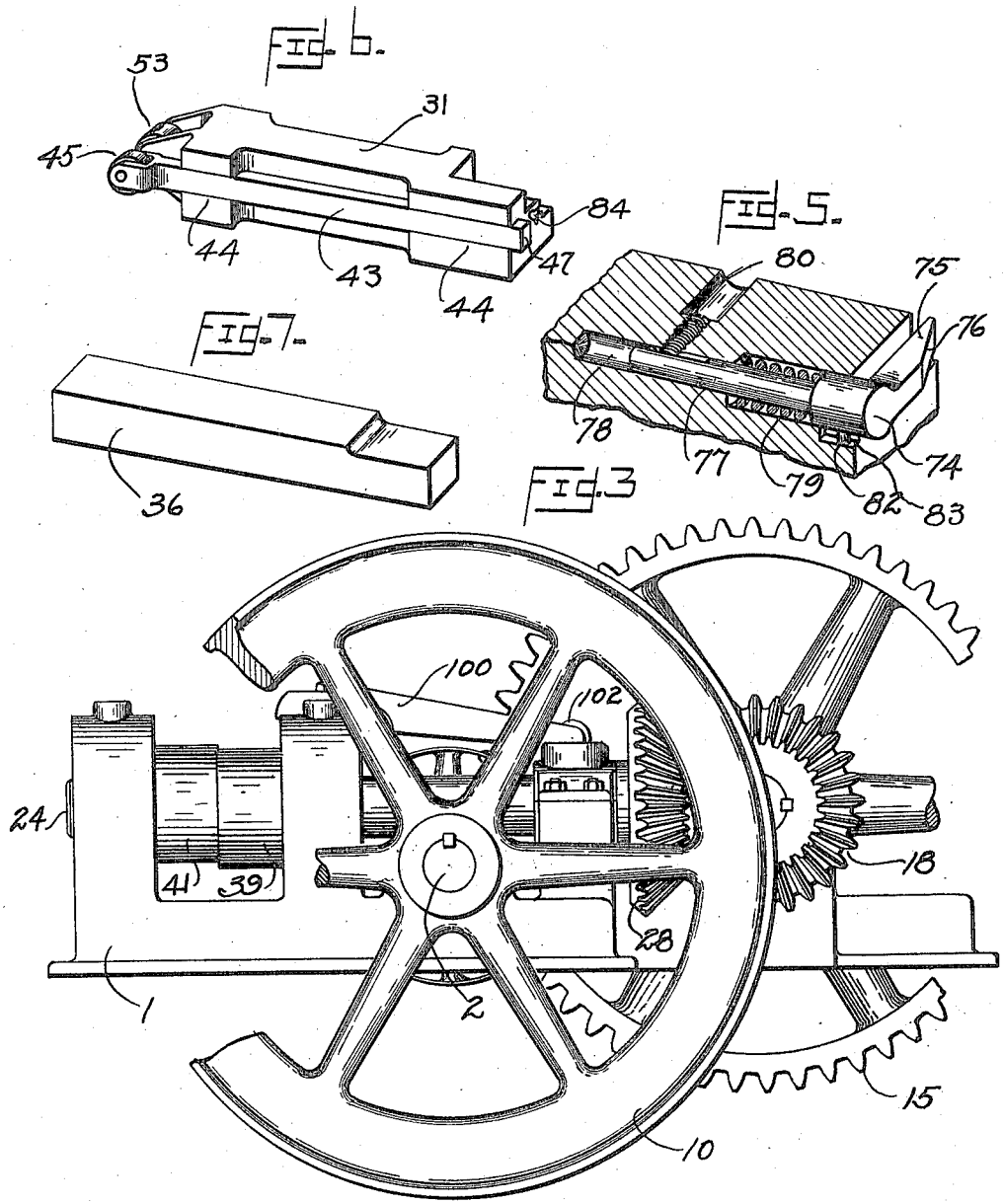
WITNESSES:
INVENTOR.
Wallace L. Field
BY
his ATTORNEYS W. L. FIELD.
HORSESHOE CALK MAKING MACHINE.
APPLICATION FILED FEB. 9, 1915.
1,169,785.
Patented Feb. 1, 1916.
5 SHEETS—SHEET 4.
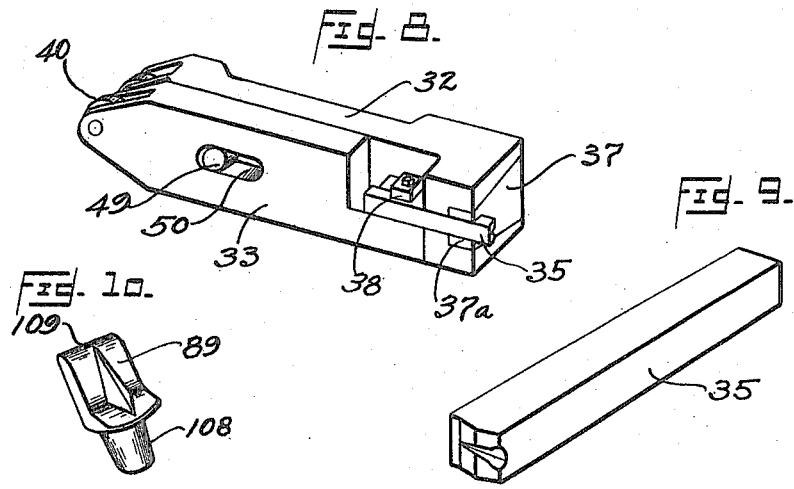
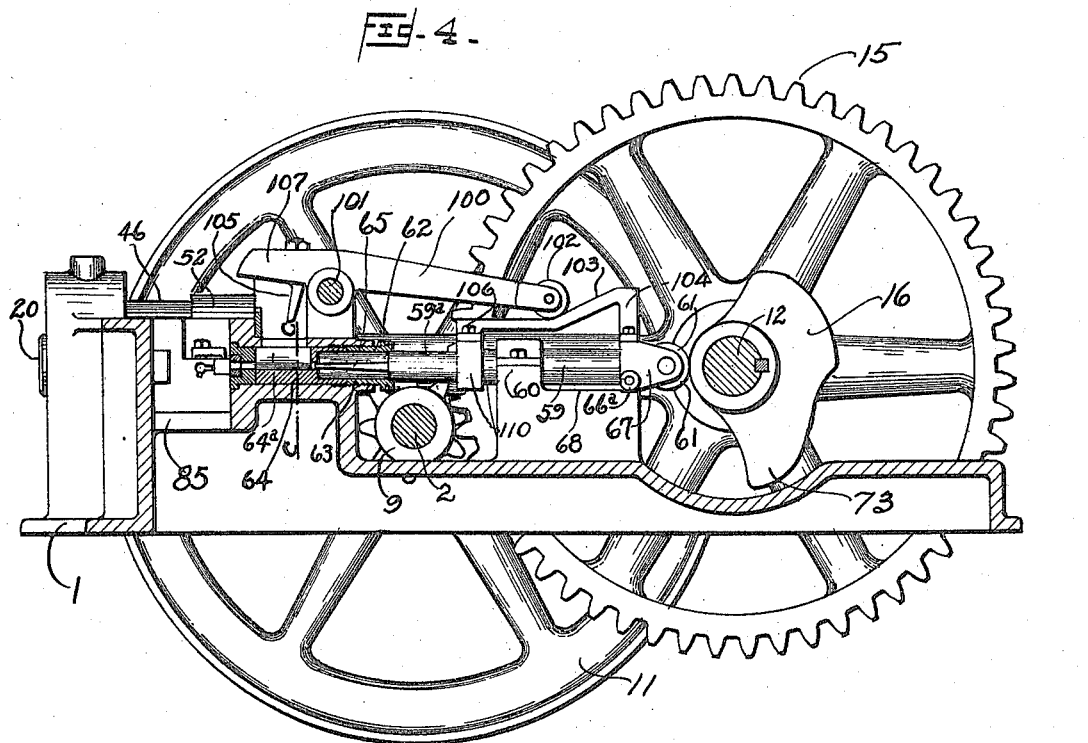
WITNESSES:
INVENTOR.
Wallace L. Field
BY
his ATTORNEYS

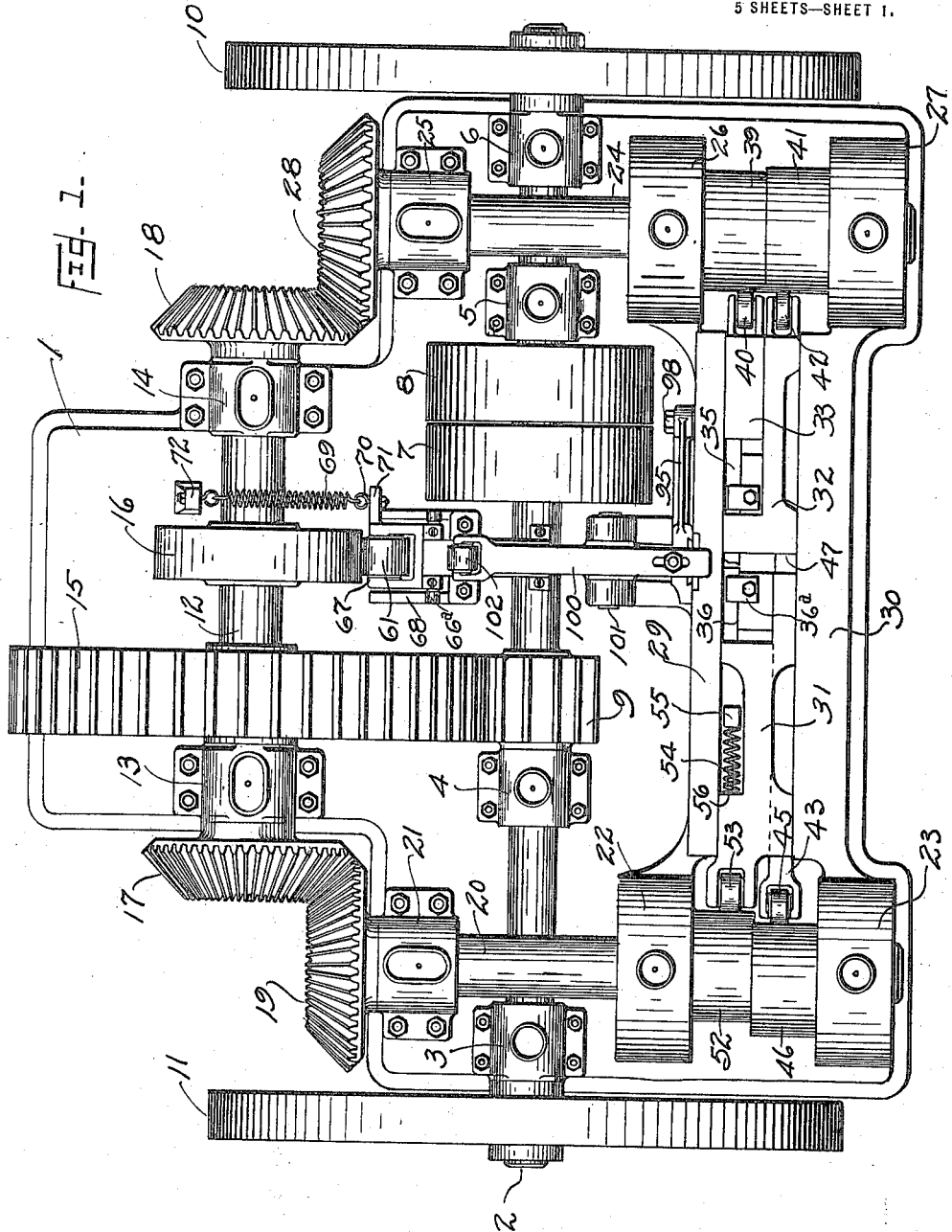

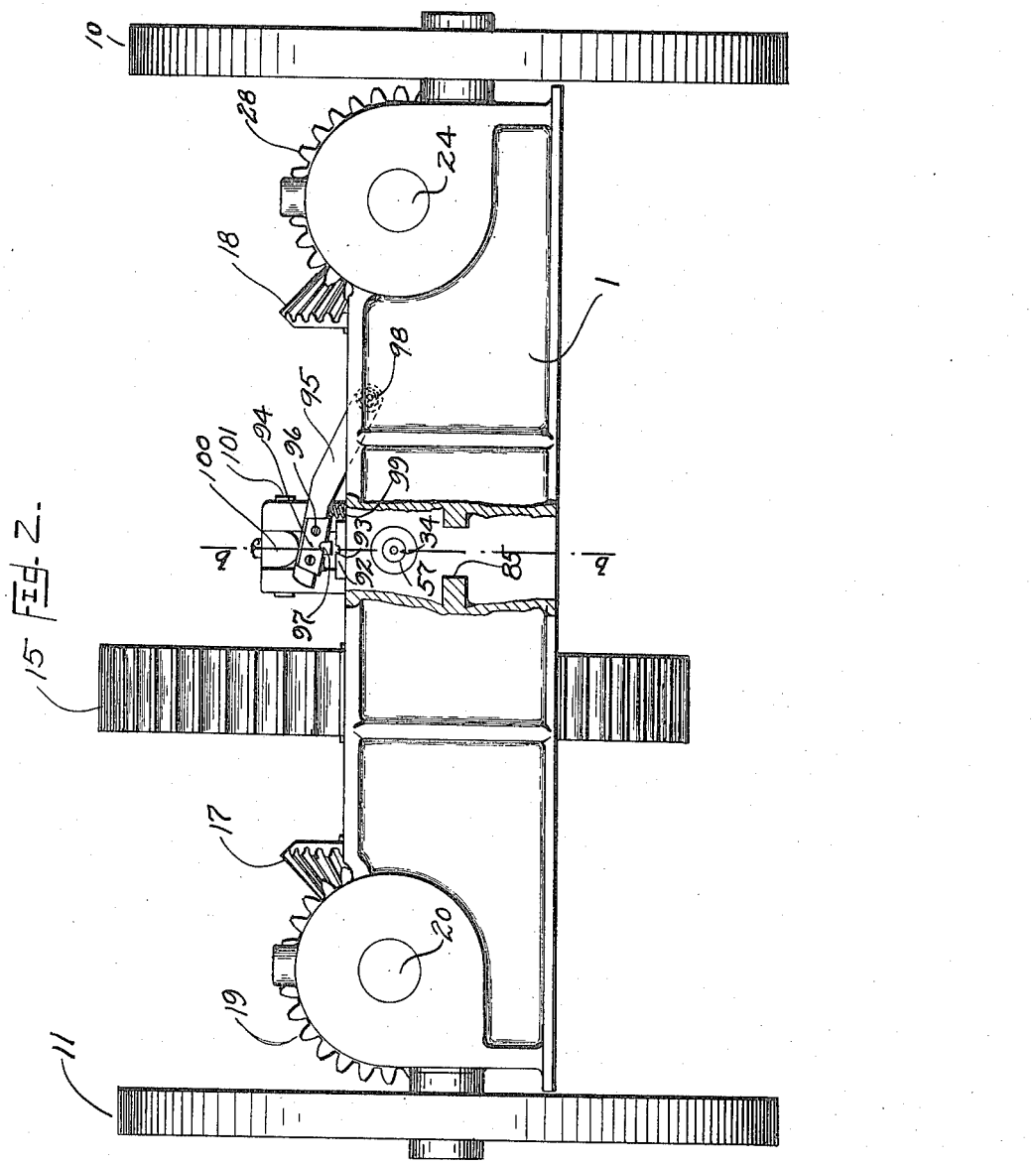

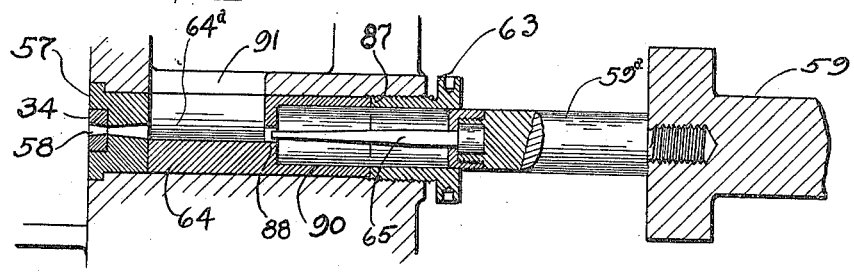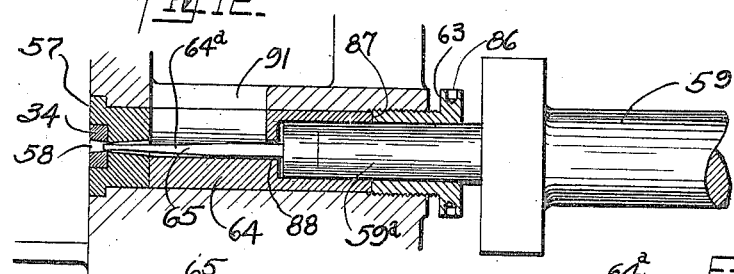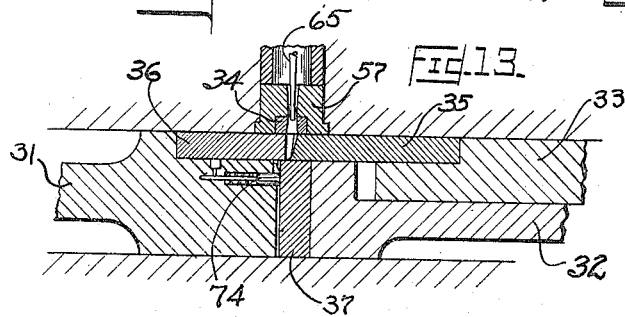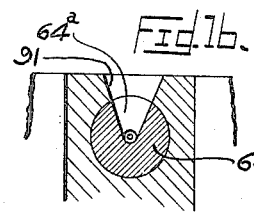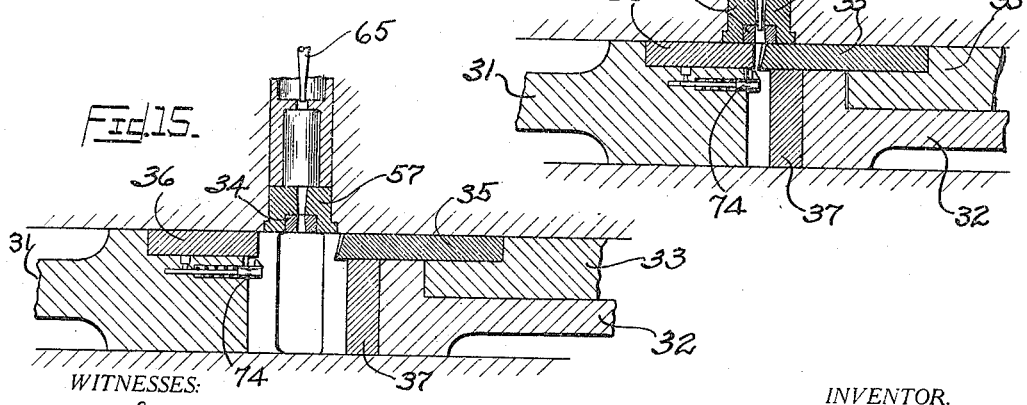

UNITED STATES PATENT OFFICE.

WALLACE L. FIELD, OF WEST DE PERE, WISCONSIN.

HORSESHOE-CALK-MAKING MACHINE.

1,169,785.

Specification of Letters Patent.

Patented Feb. 1, 1916.

Application filed February 9, 1915. Serial No. 7,175.

*To all whom it may concern:*

Be it known that I, WALLACE L. FIELD, a citizen of the United States, residing at West De Pere, in the county of Brown and State of Wisconsin, have invented a new and useful Improvement in Horseshoe-Calk-Making Machines; and I do hereby declare the following to be a full, clear, and exact description of the invention, such as will enable others skilled in the art to which it appertains to make and use the same.

The present invention comprises an improvement upon the organization shown in my aplication No. 842,238, filed June 1, 1914, which discloses and claims a horse shoe calking machine of the general character herein described. The claims in this application are limited to such improvement, or detail structure and arrangement, any broader subject matter that may be read upon the horse shoe calking machine herein disclosed being claimed, or to be claimed, in said application Serial No. 842,238.

My invention relates to a machine and dies for the same making or forming calks from a round bar of metal, said calk being formed between a three part die, in which said three die parts are arranged for reciprocating toward and from each other, in combination with a fourth die in which the shank of the calk is formed.

With these objects in view, the invention consists in certain novel features of construction and combinations and arrangements of parts, as will be more fully hereinafter described and pointed out in the claims.

In the accompanying drawings: Figure 1 is a top plan view of the machine. Fig. 2 is a front elevation thereof, showing the outer wall being broken away, disclosing the die for forming the shank of the calk. Fig. 3 is a side elevation of the machine. Fig. 4 is a transverse section of the machine taken through line *b, b,* of Fig. 2. Fig. 5 is a perspective view of the calk ejector. Fig. 6 is a perspective view of a die holding block. Fig. 7 is a perspective view of a die forming one side of the wing of the calk. Fig. 8 is a perspective view of two companion die holding blocks. Fig. 9 is a perspective view of a die for forming one side of the wing of the calk. Fig. 10 is a perspective view of a calk produced by the aforesaid machine. Fig. 11 is a central transverse section of a die for forming the shank on the calk, showing the push rod about to begin its forward stroke. Fig. 12 is a central transverse section same as Fig. 11, but showing the push rod at the forward limit of its stroke. Fig. 13 is a longitudinal section of the shank die, die holding blocks and dies when in position for forming the wing of the calk. Fig. 14 is a longitudinal section same as Fig. 13 but showing reciprocating die holding blocks and dies in position when the shank of the calk is upset by the push rod. Fig. 15 is a longitudinal section same as Fig. 13 but showing the reciprocating die holding blocks and dies in their extreme open position. Fig. 16 is a transverse section of the magazine taken on line *c, c,* Fig. 4.

Described in general the invention consists of a suitable supporting frame 1 for the several parts of the mechanism. A main drive shaft 2 mounted in the journals 3, 4, 5 and 6, said shaft having a tight and loose pulley 7 and 8 a pinion 9 and balance wheels 10 and 11 mounted thereon. The purpose of this shaft is to transfer power to the other shafts at a comparatively slow and uniform rate of speed. Arranged parallel with shaft 2 is a shaft 12 journaled in boxes 13 and 14, said shaft having mounted upon it a gear wheel 15 meshing with pinion 9 on shaft 2, a cam 16 and gear wheels 17 and 18. Meshing with gear wheel 17 is a gear wheel 19 mounted on shaft 20, said shaft being at right angles with shaft 12 and which is journaled in boxes 21, 22 and 23. On the opposite side of the machine is a shaft 24 at right angles with shaft 12 and parallel with shaft 20, which is journaled in boxes 25, 26 and 27. A gear wheel 28 secured on the end of the shaft 24 meshes with the gear wheel 18 on the shaft 12.

At the front of the bed frame 1 are longitudinally extended walls 29 and 30 between which the die holding blocks 31, 32 and 33 are arranged to be reciprocated.

The die consists of four parts, one a tapering bore 34 (Figs. 11 and 12) in which the shank of the calk is formed and three reciprocating complementary dies 35, 36 and 37 (Figs. 13, 14 and 15) for forming the wings of the calk. The die 35, see Figs. 8 and 9 is secured to the die holding block 33 by means of a screw and nut 38, said die holding block 33 with die 35 secured thereto, is forced to its extreme inward movement at each revolution of a cam 39 secured to the shaft 24 which engages the roller 40 secured in the bifurcated end of the die holding block 33.

A second die part 37 being wedge shaped is secured to the die holding block by means of its shape, one side of this die 37 having a slot 37$^a$ adapted to receive the die 35 and allow the same to slide freely therein as clearly shown in Fig. 8. The die holding block 32 being a companion to the die holder 33, is also forced to its extreme inward movement at each revolution of a cam 41 secured to the shaft 24 engaging a roller 42 which is secured in one end of the die holder 32.

A bar 43 reciprocating through a slot 44 in the die holder 31 is provided with a roller 45 (Figs. 1 and 6) which engages the cam 46 secured on the shaft 20 and at each revolution of the cam 46 the bar 43 is forced to its extreme inward limit of its movement, the end 47 of the bar 43 abuts the die holder 32 as clearly shown in Fig. 1.

It will be seen that as the bar 43 is moved by the cam 46 toward its inward limit of movement, the die holding block 32 will be forced toward its outward limit of movement, the cam 41 on the shaft 24 being so timed as to allow such outward movement. A pin 49 (see Fig. 8) secured in the die holding block 32 and sliding within the slot 50 of its companion die holder 33, is for the purpose of causing the die holder 33 to be carried to the outward limit of its movement by the die holder 32, when the pin 49 has reached the length of the slot 50, in the die holder 33.

A third die part 36 secured to a die holding block 31, by means of a screw and nut 36$^a$, is arranged to be reciprocated on the same plane toward and from the dies 35 and 37, this die 36 and holder 31 being forced to its extreme inward movement, which limit is in near contact with its opposite reciprocating companion dies 35 and 37, at each revolution of a cam 52, mounted on the shaft 30, engaging the roller 53 in the end of the die holder 31. A spring 54 having one end abutting a post 55, the other end abutting a shoulder 56 of the die holder 31, which normally holds the die holder 31 at the outward limit of its movement.

The fourth die 34 (see Figs. 11 and 12) is secured within a holder 57 in the wall 29 of the frame 1, this die 34 has a tapering bore 58 in which the shank of the calk is formed. This die 34 having its bore adjacent to the meeting points of the dies 35, 36 and 37 and at right angle to the line of movement of the dies, 35, 36 and 37.

A shaft 59 is arranged to be reciprocated in the bearing 60 and is provided upon one end with a roller 61 for being engaged by a cam 16, the other end 59$^a$ is fitted to slide into a bore 62 of the adjusting nut 63 and magazine 64 in the frame 1. The shaft 59 has a punching rod 65 extended from its end which passes through the magazine 64$^a$ and enters the tapering bore of the die part 34. This rod 65 is round and of a diameter not larger than that of the rod from which the calk is to be made, and its inward reciprocation is so timed to be forced against the end of the calk immediately after the die parts 35, 36 and 37 have reached their inward movement as shown in Fig. 14, thus upsetting the shank and forming its taper. Small rollers 66$^a$ are arranged on each side of the head piece 67, which roll along the upper edge of the laterally extended walls 68, of the bed frame 1 and act as an efficient support for the head piece 67 as it reciprocates.

A spring 69 being secured by an eye bolt 70 to an extended arm 71 on the head 67 and having its other end secured in like manner to the post 72, normally holds the shaft 62 carrying the punching rod 65 at its outward limit of movement.

The cam 16 is provided with a nose 73, (see Fig. 4) which engages the roller 61 and forces the completed calk forward from the bore in the die part 34. It has been found by experience that the heated metal would adhere to the end of the push rod 65 and which prevented the completed calk from dropping after it had been pushed forward from the tapering bore of the die part 34, therefore, I provide an ejector Fig. 5 having an enlarged head 74, an extended portion 75 with a beveled face 76 at its outer extremity, a stem 77 fitting the bore 78, a spring 79 behind the head 74 normally holds the ejector out. A set screw 80 having an end on the flattened portion of the stem 77 prevents displacement of the ejector by the spring 79, a key pin 82 secured in the head 74 and fitting within the recess 83 keeps the head 74 from being accidentally turned.

The ejector Fig. 5 is inserted in a bore 84 in the end of the die holder 31 as shown in Figs. 13, 14 and 15 and as the finished calk is pushed forward by the push rod 65 the wing 89 of the finished calk which is formed by the reciprocating dies 35, 36 and 37 will strike the beveled face 76 of the extended portion 75 on the ejector Fig. 6 and will be pushed off the end of the push rod 65, when it will drop through an opening 85 in the bed frame 1.

A magazine shaft 64 (see Figs. 11, 12 and 13

16) having a longitudinal V shaped groove 64ª in one end, wherein the portion of metal for forming the calk is deposited, the other end having a bore 88 and 90 through which the punch rod 65 reciprocates. This magazine shaft 64 is cylindrical in shape and is inserted in a bore in the frame 1 directly back and adjacent to the die holder 57, the end having the V shaped groove 64ª abuts the die holder 57, the groove 64ª being in line with an aperture 91 in the frame 1.

An adjusting nut 63 (Figs. 11 and 12) the purpose of which is to bring the die 34 to the exact point necessary for forming the shank on the calk, is threaded into the bed frame 1 and having a bore 62 within which the push rod 65 and shaft 59ª reciprocate, a face 87 of the nut 63 abuts the magazine 64. It will be seen that as the nut 63 is turned inward by means of the holes 86 in the head of the nut 63 the magazine shaft 64 which abuts the die holder 57 will be caused to advance a distance equal to the amount the nut 63 is advanced inward, thereby advancing the die 34 to its proper position in connection with the reciprocating dies 35, 36 and 37.

A shear die 92 (see Fig. 2) provided with a half round recess 93 is secured to the wall 29 of the bed frame 1, the recess 93 being elevated above the upper edge of the wall 29 as clearly shown in Fig. 2. A companion die 94 secured to the arm 95 by the screws 96 is also provided with a half round recess 97, a screw 98 in the wall 29 of the bed frame 1 to which the arm 95 is pivoted upon, and a spring 99 which normally holds the arm 95 up. The arm 95 carrying the die 94 is arranged to be forced down by the arm 100, shearing off the required length from a heated bar from which the calk is made, as it passes the die 92. The arm 100 mounted on the pin 101, has a roller 102 upon one end which engages the inclined face 103 of the bridge 104, and at the opposite end of the arm 100 is an abutment 105 by which the length of the rod from which the calk is to be formed is gaged. The bridge 104 is mounted and secured upon the heads 67 and 110 on the reciprocating shaft 59 by the screws 106. It will be seen that as the cam 16 forces the shaft 59 carrying the bridge 104 inward, the roller 102 will mount the inclined face 103, causing the opposite end 107 of the arm 100 to swing down, this end 107 bearing on the upper edge of the arm 95 which carries the die 94, will force the arm 95 to move down, and as the die 94 approaches the die 93, the metal from which the calk is formed will be severed between it and the abutment 105, this metal so severed drops into the magazine 64ª directly below.

The finished calk Fig. 10 is preferably provided with a round tapering shank 108 and wing 89, this wing has a smooth and nearly flat face upon one side and a wedge shaped ribbed face upon the other, merging with a somewhat sharp edge 109. It, of course, should be understood that I do not limit myself to any particular form of a calk to be produced by this invention as set forth as constituting the preferred form, since this form may be modified by simply changing the reciprocating die parts to produce the form to suit the judgment of those skilled in the art, without departing from the spirit of the invention.

The operation of the machine will be readily understood from the foregoing description and the drawings illustrative thereof. To produce a finished calk the operator places a round bar of metal heated to the required degree over the half round recess 93 in the shear die 92, the heated bar of metal being pushed inward against the abutment 105 on the arm 100. The shaft 59 being forced inward by the cam 16, the inclined face 103 of the bridge 104 mounted on the shaft 59, will engage the roller 102 forcing the end 105 of the arm 100 down, causing the arm 95 carrying the shear die 94 to approach the die 93 which will shear the required length of metal from which the calk is to be formed. The piece of metal so severed drops into the magazine 64ª, the push rod 65 advancing inward passes through the magazine 64ª, pushes the severed piece of metal into the tapering bore 58 of the die part 34, to a point where a portion of its end for forming the wing 89 of the calk is projected out past the face of the die part 34, the other end for forming the shank remaining within the tapering bore 58. The cam 16 being so arranged and timed as to cease moving the push rod farther inward until the wing 89 of the calk is formed by the meeting of the dies 35, 36 and 37, which are secured to the die holders 31, 32 and 33, and which are forced to their extreme inward position to form the wing 89 by the cams 39, 41 and 52, as shown in Fig. 13. The die 36 secured to the die holder 31 entering the slot 37ª in the die 37, leaving the part in which the wing of the calk is formed entirely contained within the die 37, there being no outlet from the dies for any overflow of metal. Immediately after the wing 89 of the calk has been formed, the die holder and die 37 are forced back as shown in Fig. 14, by the bar 43 engaging the cam 46. The dies 35 and 36 remain in position as shown in Fig. 14, holding the wing 89 of the calk, at which time the push rod 65 is advanced a little farther inward by the cam 16, upsetting and tapering the portion of metal contained within the tapering bore 58 of the die part 34. The dies 35 and 36 then recede to their open position, the nose 73 of the cam 16, acting upon the shaft 59 forces the push rod 65 forward, pushing the wing of the finished calk against the slanting face 76 of the ejector Fig. 8, the calk then drops through an opening 85 in the bed frame 1, the push rod 35 then returning to its outward limit of its stroke as shown in Fig. 15 leaving the die parts open to repeat their operation.

Having thus described my invention, what I claim and desire to secure by Letters Patent, is:—

1. A horse shoe calk forming machine, consisting of a frame for supporting the mechanism of the machine, a shaft arranged for revolution thereon, bevel gear wheels upon said shaft, shafts arranged at right angles with first named shaft, said second named shafts arranged parallel with one another, gear wheels mounted on the ends of said second parallel shafts meshing with said gear wheels on first named shaft, a plurality of die parts secured in a plurality of die holding parts and arranged for reciprocating parallel with first named shaft and intermediate second named parallel shafts, means on second parallel shafts for forcing said die parts toward one another, a die part having a tapering bore arranged in position adjacent and opposite the meeting point of the first named die parts, a punching rod arranged to be reciprocated into said tapering bore, means for forcing said punching rod into said tapering bore, and means for returning said punching rod to the outward limit of its stroke, substantially as set forth.

2. In a machine of the class described, consisting of a frame for supporting the mechanism of the machine, a shaft arranged for revolution thereon, gear wheels upon said shaft, shafts arranged at right angles with the first named shaft, said second named shafts arranged parallel with one another, gear wheels mounted on the ends of said second parallel shafts meshing with said gear wheels on first named shaft, die parts arranged in die holding parts, said die holding parts and dies arranged to be reciprocated parallel with first named shaft and intermediate second named parallel shafts, cams upon the second mentioned parallel shafts arranged for forcing die holding parts and dies toward each other, a shaft arranged for sliding movement toward and from first named die parts intermediate and parallel with second mentioned parallel shafts, a die part arranged in position adjacent to and opposite the meeting point of first named die parts having a tapering bore of the diameter of the shank of the calk to be formed, a punching rod extending from the end of said sliding shaft and arranged to be reciprocated into said tapering bore of said die part, means for sliding said sliding shaft toward the meeting point of the first named die parts immediately after the first named die parts have been advanced toward each other, means for returning the first named die parts and said sliding shaft to the outward limit of their movement, substantially as described.

3. In a machine of the class described consisting of a supporting frame, a plurality of shafts arranged for rotation thereon, a plurality of die holding parts arranged to be reciprocated in said supporting frame, means carried by said shafts for reciprocating said die holders, a plurality of dies secured to said die holders and arranged to be reciprocated therewith, a stationary die part carried by said frame and positioned adjacent the inward positions of the said reciprocating die parts, means carried by said supporting frame adapted to be reciprocated into said stationary die part for upsetting the shank of the calk, means carried by one of said reciprocating die holders for ejecting the finished calk from the said stationary die part, substantially as described.

4. In a machine of the class described consisting of a supporting frame, a plurality of shafts arranged for rotation thereon, a plurality of die holding parts arranged to be reciprocated in said frame, a plurality of dies secured to said die holders and arranged to be reciprocated therewith, a die part having a tapering bore wherein the shank of the calk is formed, said shank forming die positioned in said supporting frame adjacent the inward position of the said reciprocating dies, means adjacent said shank forming die adapted to receive a bar of metal from which the calk is formed, a push rod adapted to be reciprocated through said metal receiving means and into said shank forming die for the purpose of upsetting the shank of the calk, means carried by said shaft for reciprocating said push rod, and means upon said shafts for reciprocating said die holders substantially as set forth.

5. In a machine of the class described consisting of a supporting frame, a plurality of shafts arranged for rotation thereon a plurality of die holding parts arranged to be reciprocated in said frame, means upon said shafts for reciprocating said die holders, a plurality of dies carried by said die holders and arranged to be reciprocated therewith, said dies adapted to form the wing of the calk, a shank forming die having a tapering bore, said shank forming die positioned adjacent the inward point of travel of the said reciprocating dies, means adapted to receive a bar of metal from which the calk is formed, said means positioned in said frame adjacent the bore of the said shank forming die, means carried by said frame adapted to cut off a piece of metal from which the calk is formed, said cutting means superimposed over said metal receiving means, a push rod adapted to be reciprocated through said metal receiving means and into said tapering bore, means upon one of said shafts adapted to reciprocate said push rod, means adapted to be reciprocated with said push rod for the purpose of operating said cutting means, substantially as set forth.

In testimony whereof I hereunto affix my signature in presence of two witnesses.

WALLACE L. FIELD.

Witnesses:
  GEO. GIBBS,
  L. J. MORROW.

Copies of this patent may be obtained for five cents each, by addressing the "Commissioner of Patents, Washington, D. C."